H. B. ZERR.
WHEEL BEARING.
APPLICATION FILED FEB. 27, 1909.
968,911.
Patented Aug. 30, 1910.
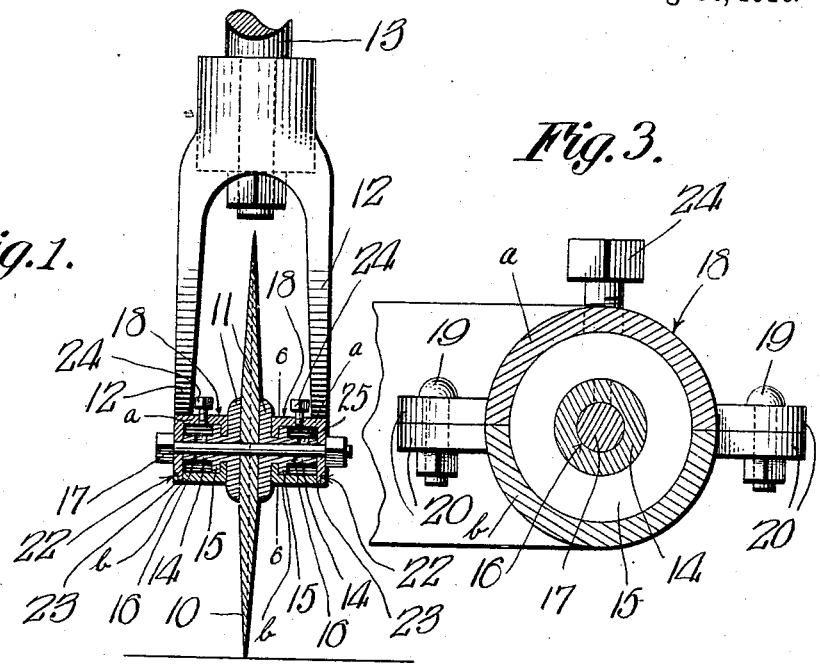
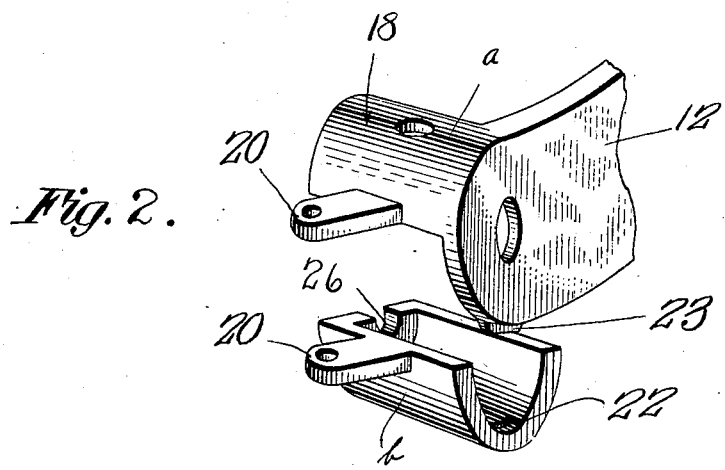
Witnesses
Chas. C. Richardson
M. T. Miller
Inventor
Harry B. Zerr,
By Chandler & Chandler
Attorneys

UNITED STATES PATENT OFFICE.

HARRY B. ZERR, OF WAWAWAI, WASHINGTON.

WHEEL-BEARING.

968,911.  Specification of Letters Patent.  Patented Aug. 30, 1910.

Application filed February 27, 1909. Serial No. 480,303.

*To all whom it may concern:*

Be it known that I, HARRY B. ZERR, a citizen of the United States, residing at Wawawai, in the county of Whitman, State of Washington, have invented certain new and useful Improvements in Wheel-Bearings; and I do hereby declare the following to be a full, clear, and exact description of the invention, such as will enable others skilled in the art to which it appertains to make and use the same.

This invention relates to wheel bearings and has for its principal object to provide a dust proof bearing for wheels of various types, but more particularly to colter wheels for plows, and like implements which, from their position and the work performed by them, are especially liable to become dirty from the falling of earth from the wheel onto the bearings and entering the same to cause the lubricant therein to dry and the bearings and axle of the wheel to be cut by the grit and dust.

To this end, the invention comprises a boxing attached to the lower end of each arm of a fork in which boxing an axial stud or finger on each side of the wheel turns, said boxings being of greater diameter than the studs and serving as receptacles for oil or other lubricant. An axle on which the wheel rotates extends through the boxing and longitudinally through the studs and is lubricated through a slot in each stud. Side movement of the colter or other wheel is prevented by means of a collar on each stud bearing against the inner side of its respective boxing.

With these and other objects in view, the invention consists of a novel construction, combination and arrangement of parts hereinafter described and claimed, and illustrated in the accompanying drawings, in which, Figure 1 is a vertical section of a colter wheel mounted in a fork provided with improved bearings. Fig. 2 is a perspective view of one of the fork arms. Fig. 3 is a sectional view on the line 6—6 of Fig. 1.

Similar reference characters are used for the same parts throughout the figures.

In the drawings, the numeral 10 indicates a colter wheel mounted in bearings on the lower ends of the arms 12 of a fork vertically rotatable on the lower end of a rod or bar 13 all in the usual manner. Bolted or otherwise fastened to the colter wheel 10, are two disks 11 which form hubs therefor from each of which projects in opposite directions in the axis of said colter wheel, a stud 14, each provided with a projecting collar 15 a short distance away from said disks 11. A bore 16 extends longitudinally through the studs 14 and the colter wheel for an axle 17 on which the colter wheel rotates.

A housing 18 on the lower end of each arm 12 of the supporting fork extends inwardly in a horizontal direction for a suitable distance to receive the studs 14, and form a receptacle for oil or other lubricant. Each of these housings is made in two parts, the upper part *a* being integral with the fork ends, while the lower part *b* is made separate and attached to the upper part by means of bolts 19 passing through ears 20 projecting laterally from each part of said housing. The inner ends of the parts *a* and *b* of the housings are closed, except for semi-circular openings 26 which form the journals for the studs 14, said studs projecting into the housings. The lower sections or caps *b* of the housings are open at their outer ends and are provided just within said edges with slots 22 through which pass, when the caps are bolted in place, studs 23 projecting downwardly from the curved ends of the fork arms 12 which curved ends close the outer ends of the housings sufficiently tight to prevent the escape of lubricant. If desired, packing of any kind may be employed to insure the tight closure of these outer ends. The interior diameter of the housing is greater than the diameter of the studs or fingers 14, as previously stated, to form a receptacle or holder for a lubricant which is poured thereinto through an opening in the top of each housing *a*, said opening being closed by a bolt 24 at other times to prevent dust and dirt from entering the receptacle. The shaft 17 of the colter wheel is lubricated through a slot 25 formed in the stud or finger 14 which opening leads direct to said shaft.

In assembling the parts, the housing caps *b* are removed from the parts *a* of the housing as shown in Fig. 4 and the colter wheel placed in said housing parts from below, the distance between the inner ends of said parts being such that the collars 15 on the studs 14 will enter said housing sections and bear against the closed inner ends thereof, thus preventing any lateral movement of the wheel. The caps *b* are then placed beneath the studs 14 and bolts passed through the lugs 20 to fasten the caps in place, care being taken that the projections 23 enter the slots 22 in the outer ends of said caps. The shaft 17 is preferably made of a long bolt headed at one end to bear against the outer end of one housing and provided on its other end with a nut to bear against the outer side of the other housing.

What is claimed is:—

1. In a wheel bearing, a wheel, a disk secured on each side of the wheel, each disk having a stud extending outwardly therefrom and provided with an axial bore therethrough and a collar on each stud combined with a hollow two-part housing for each stud and larger than the same to form a lubricant receptacle, the collars on said studs being adapted to rotate within said housings and bear against the closed inner ends thereof, and a shaft for the wheel extending through the bores in the studs and through the outer ends of the housings by which latter it is supported, an opening being made in each stud to admit the lubricant to the shaft.

2. In a wheel bearing, a wheel, a disk secured on each side of the wheel, each disk having a stud extending outwardly therefrom and provided with an axial bore and a collar on each stud, combined with a hollow two-part housing for each stud, said housings secured each at one end on a relatively fixed support and extending toward each other, the under part of each housing being removable, and a shaft on which said disks and wheel revolve extending through the bores in said wheel and disks and through the outer ends of said housings, by which latter it is supported, said housings having a greater diameter than the studs to provide a lubricant receptacle and to receive said collars on the studs.

3. In a wheel bearing, a wheel, a disk secured on each side of the wheel having a stud extending outwardly therefrom and provided with an axial bore therethrough and a collar on each stud, combined with a relatively fixed divided support to each of the ends of which is secured one end of the upper half of a hollow two part housing, said housing extending inwardly from each arm of the divided support to receive said studs and being formed larger than the studs to produce a lubricant receptacle and to receive said collars, which bearing against the inner ends of the housings prevent lateral movement of the wheel, the removable lower halves of said housings being formed with open ends which are closed by the arms of said divided support, said support having lugs arranged to enter a slot in each of said removable lower halves, and a shaft on which said wheel, disks and studs revolve extending through the bore in the wheel and disk and through the outer ends of said housings by which latter it is supported.

4. A wheel bearing, comprising a wheel, a disk secured on each side of the wheel having laterally projecting studs and an axial bore therethrough from end to end, combined with a housing for each stud and larger than the same to form a receptacle for a lubricant, a relatively fixed support with which the upper half of said housing is integral, the lower half of said housing being removable from the upper half and adapted to be bolted thereto, said removable portion of the housing having its outer end open and arranged to be closed by the end of said support, from which latter a lug projects downwardly through a slot in the removable portion of the housing.

In testimony whereof, I affix my signature, in presence of two witnesses.

HARRY B. ZERR.

Witnesses:
JOHN M. KLEMGARD,
C. A. PRICE.